(12) United States Patent
McCallum et al.

(10) Patent No.: US 8,914,398 B2
(45) Date of Patent: Dec. 16, 2014

(54) METHODS AND APPARATUS FOR AUTOMATED KEYWORD REFINEMENT

(75) Inventors: Daniel A. McCallum, Payson, UT (US); Jason A. Carter, Lehi, UT (US); Darren R. Noble, Orem, UT (US); Adam I. Stevenson, Highland, UT (US); Roy Gray Merrill, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/223,209

(22) Filed: Aug. 31, 2011

(65) Prior Publication Data

US 2013/0311505 A1    Nov. 21, 2013

(51) Int. Cl.
*G06F 7/00* (2006.01)
*G06F 17/30* (2006.01)

(52) U.S. Cl.
USPC ............................................... 707/767

(58) Field of Classification Search
USPC ......... 707/767, 731, 732, 738, 739, 740, 759, 707/769, 805
See application file for complete search history.

(56) References Cited

U.S. PATENT DOCUMENTS

| | | | |
|---|---|---|---|
| 7,707,127 B2 | 4/2010 | Jhala et al. | |
| 7,730,061 B2 | 6/2010 | Gruhl et al. | |
| 7,827,174 B2* | 11/2010 | Henkin et al. | 707/726 |
| 7,836,077 B2* | 11/2010 | Azvine et al. | 707/771 |
| 8,275,722 B2 | 9/2012 | Jhala | |
| 2002/0092031 A1* | 7/2002 | Dudkiewicz et al. | 725/138 |
| 2005/0198068 A1* | 9/2005 | Mukherjee et al. | 707/104.1 |
| 2005/0234881 A1* | 10/2005 | Burago et al. | 707/3 |
| 2006/0161520 A1* | 7/2006 | Brewer et al. | 707/3 |
| 2006/0248078 A1* | 11/2006 | Gross et al. | 707/5 |
| 2006/0282328 A1* | 12/2006 | Gerace et al. | 705/14 |
| 2007/0143266 A1* | 6/2007 | Tang et al. | 707/3 |
| 2007/0226204 A1* | 9/2007 | Feldman | 707/5 |
| 2007/0244866 A1* | 10/2007 | Mishkanian et al. | 707/3 |
| 2007/0265857 A1* | 11/2007 | Shivaji Rao | 705/1 |
| 2008/0016059 A1* | 1/2008 | Henkin et al. | 707/5 |
| 2008/0195582 A1* | 8/2008 | Yu et al. | 707/3 |
| 2008/0208819 A1* | 8/2008 | Wang et al. | 707/3 |
| 2008/0256109 A1* | 10/2008 | Irvin et al. | 707/102 |
| 2008/0266449 A1* | 10/2008 | Rathod et al. | 348/468 |
| 2008/0294622 A1* | 11/2008 | Kanigsberg et al. | 707/5 |
| 2009/0019002 A1* | 1/2009 | Boulis | 707/3 |
| 2009/0144248 A1* | 6/2009 | Treadgold et al. | 707/3 |
| 2009/0187515 A1* | 7/2009 | Andrew et al. | 706/12 |
| 2010/0017289 A1* | 1/2010 | Sah et al. | 705/14.49 |
| 2010/0049504 A1* | 2/2010 | Rajan et al. | 704/10 |

(Continued)

FOREIGN PATENT DOCUMENTS

EP    1861820    12/2007

*Primary Examiner* — Robert Beausoliel, Jr.
*Assistant Examiner* — Nicholas Allen
(74) *Attorney, Agent, or Firm* — Kilpatrick Townsend & Stockton LLP

(57) ABSTRACT

Methods and apparatus for an automated keyword refinement tool for generating an output set of keywords. The keyword refinement tool may utilize or incorporate results from keyword suggestion tools and keyword ranking tools in order to determine a set of keywords that produce better search engine results that if the keyword suggestion tools or keyword ranking tools were utilized individually. The keyword refinement tool may use a variety of methods for determining input to keyword suggestions tools and keyword ranking tools and a variety of methods for combining the results from the keyword suggestion tools and keyword ranking tools.

19 Claims, 8 Drawing Sheets

(56) References Cited

U.S. PATENT DOCUMENTS

| | | | |
|---|---|---|---|
| 2010/0094673 A1* | 4/2010 | Lobo et al. | 705/7 |
| 2010/0169249 A1 | 7/2010 | Jhala et al. | |
| 2010/0250524 A1* | 9/2010 | Hu et al. | 707/723 |
| 2010/0293162 A1* | 11/2010 | Odland et al. | 707/736 |
| 2011/0047136 A1* | 2/2011 | Dehn | 707/706 |
| 2011/0225019 A1* | 9/2011 | Taylor et al. | 705/7.28 |
| 2012/0102153 A1* | 4/2012 | Kemp et al. | 709/219 |

* cited by examiner

Create Job

A Job is the structure that defines where Automated Campaign Generation should look for information, what objects it should create, and how often it should create them. More info.

Job Name: [          ]
Account: [--Select Account--]
Job Status: [Active ▼]
Job Type: RSS
Email: [          ]

☑ Overwrite existing campaign data.

⯆ Sources ⟩ A Source of the location of the content to be used to build campaigns and a mapping of how that content is to be used. More info. — 604

⯆ Campaigns & Groups ⟩ Select an existing campaign or group, or create a new campaign template or group template. More info.

⯆ Ad Templates ⟩ Ad Templates define how information from a Source will be used to create new text ads. More info.

⯅ Keywords ⟩ Enable automatic keyword generation. More info.

Automatically Generate Keywords — 602
☑ Enable

⯆ Schedule ⟩ Schedule your campaign generation job to run one time or on a recurring schedule. More info.

[Save] [Save and Run Now] [Cancel]

METHODS AND APPARATUS FOR AUTOMATED KEYWORD REFINEMENT

BACKGROUND

Automated keyword generation provides valuable advantages when producing searchable content, such as advertising and media content. When a user is browsing on the internet, the usual method by which a user reaches a website is through a search engine, and one factor in how prominently the search engine displays the website is the quality of keywords associated with the website. For search engine marketing (SEM) campaigns, bidding on the right keywords is extremely important. While keyword suggestion tools currently exist, these existing tools often produce overly broad or inapplicable keyword results. Further, in the case that a content provider is generating large amounts of searchable content, any amount of time refining keyword results from existing keyword suggestion tools quickly becomes a major hurdle. Specifically, within the context of generating automated advertising campaigns for quickly changing sources of content, it becomes extremely advantageous for a user to minimize time required to focus and refine keyword generation results to any content produced or content of interest.

SUMMARY

In one embodiment, an automated keyword refinement tool begins by receiving text input. Text input may be received from a variety of sources, such as RSS feeds or from uploaded data. The automated keyword refinement tool may then provide the text input to an existing keyword suggestion tool, in order for the keyword suggestion tool to generate an initial output of one or more keywords based on the text input. The automated keyword refinement tool may also apply a text reduction function to the text input in order to generate a reduced text that is a subset of the input text. The text reduction function is based on a term importance scoring of terms in the text input. The keyword refinement tool may then provide the reduced text to the existing keyword suggestion tool, where the keyword suggestion tool generates an output of one or more keywords based on the reduced text. Given these multiple outputs of one or more keywords from the existing keyword suggestion tool operating on the original text input and the reduced text produced by the text reduction function, a keyword set output may be generated by the combination or other manipulation of the one or more keywords based on the input text and the one or more keywords based on the reduced text.

BRIEF DESCRIPTION OF THE DRAWINGS

FIG. 6 depicts an illustration of an interface through which a user may create an automated campaign generation job, which includes the option of invoking the keyword refinement tool.

Figure 1:
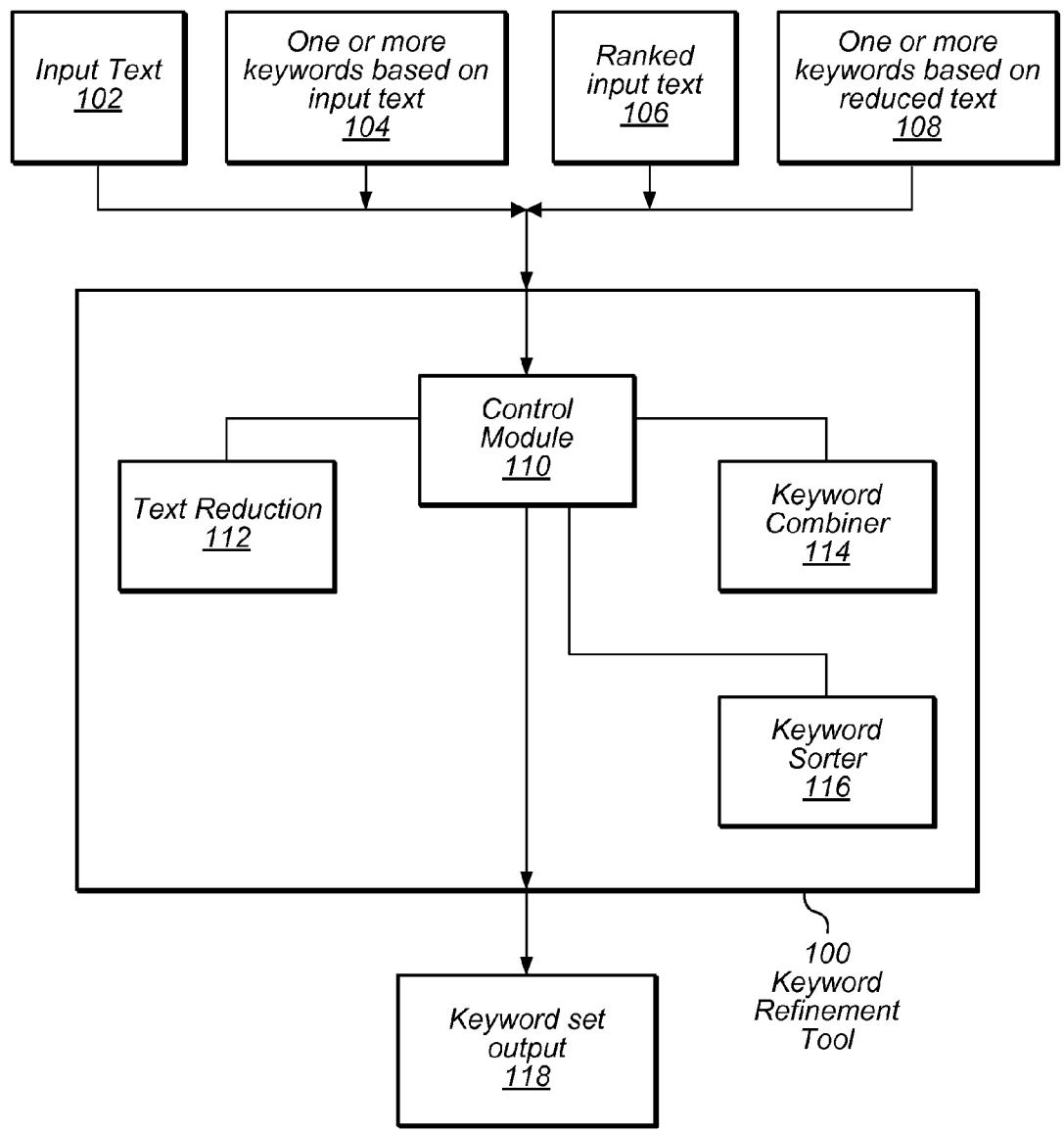
FIG. 1 illustrates a module that may implement a keyword refinement tool, according to some embodiments.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Various embodiments of a keyword refinement tool provide a user with a method to reduce or eliminate the amount of oversight required to automatically produce high quality keywords associated with content or objects produced from a given input source. Automatic keyword generation as provided by the keyword refinement tool may be incorporated into a variety of methods for producing searchable content on the internet or within a file system or database.

In one embodiment, the keyword refinement tool may be incorporated with a system for generating automated advertising campaigns. For example, a user may have a wide variety of products to sell and may require one or more versions of advertising content. In one embodiment, the user may want to select an RSS feed with a constant or intermittent stream of input regarding products for which advertising content is to be generated. In this case, the keyword refinement tool may be used by an advertising campaign generator. In such a case, the keyword refinement tool may provide one or more keywords for advantageously positioning a generated advertising object within the search results of a search engine without a user's intervention.

In another example, a website manager may maintain a website with a large number of pages. In such a case, to find specific content, a user may often use a search tool provided by the website. If the content of each web page is used to generate a set of keywords to be associated with that web page, then search results returned to a user may provide a more relevant ranking and display of search results.

Even in cases where an individual or small number of content is the source from which keywords are to be generated, existing keyword generators often produce a great number of results that are not high quality keywords. A high quality keyword is one which is closely tailored to the source content, providing relevance and a highly visible positioning within search engine results. The disclosed keyword refinement tool, which in some embodiments, makes use of third party tools, provides additional computing methods that serve to improve upon results from existing third party keyword generators and keyword ranking tools.

In the following detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Embodiment: Keyword Refinement Tool

FIG. 1 illustrates an embodiment of a Keyword Refinement Tool 100. Given input text 102, the Keyword Refinement Tool 100 may generate an output set of keywords. In some embodiments, and in the embodiment depicted in FIG. 1, the Keyword Refinement Tool 100 may use third party tools for performing keyword suggestions and keyword ranking. In this embodiment, additional input may be (1) one or more keywords 104 based on input text 102 received after Control Module 104 provides the input text to a keyword suggestion tool, (2) ranked input text 106 based on input text 102 after Control Module 104 provides input text 102 to a keyword ranking tool, and (3) one or more keywords 108 based on a reduced text.

Input text 102 may include any number of words or phrases. Throughout this application, a keyword may be either a single word or a phrase made up of more than one word. In some embodiments, the Keyword Refinement Tool 100 begins with receiving input text 102. Input text 102 may be received from, for example, an RSS feed, may be received as part of an upload of documents or files, or may be received through a user interface. In some embodiments, when input text 102 is received through a user interface, a real-time display of a keyword output set produced by Keyword Refinement Tool 100 may be displayed to the user, and in some cases, within an output area of the same user interface.

In some embodiments, Control Module 110 may receive input text 102 and then provide input text 102 to a keyword suggestion tool. Upon processing by the keyword suggestion tool, Control Module 110 may receive the one or more keywords 104 based on input text 102.

In some embodiments, Control Module 110 may also provide input text 102 to a keyword ranking tool or a term importance scoring tool, which upon processing, may return a list of the terms or keywords within input text 102 along with an accompanying score for each term or keyword.

In some embodiments, Control Module 110 may then provide ranked input text 106 to module Text Reduction 112. The Text Reduction 112 module apply a text reduction function ranked input text 106 in order to generate a reduced text that is a subset of input text 102.

In some embodiments, Control Module 110 may provide the reduced text generated by the Text Reduction 112 module to the keyword suggestion tool in order for the keyword suggestion tool to generate and provide the one or more keywords 108 based on the reduced text.

In some embodiments, Control Module 110 may generate keyword set output 118 from a combination of the one or more keywords 104 based on input text 102 and the one or more keywords 108 based on reduced text. The combination may be performed to generate the keyword set output by Keyword Combiner 114.

In some embodiments, prior to generating keyword set output 118, Control Module 110 may invoke Keyword Sorter 116 in order to sort the combined output produced by Keyword Combiner 114, where the keywords within keyword set output 118 are sorted according to a number of occurrences of a given keyword of keyword output set 118 within input text 102.

Each of the modules within Keyword Refinement Tool 100 may be implemented by program instructions stored in a computer-readable storage medium and executable by one or more processors. Other embodiments of the modules within the text adjustment tool may be at least partially implemented by hardware circuitry or firmware within one or more processors.

Example Embodiment: Generating a Keyword Set

Figure 2:
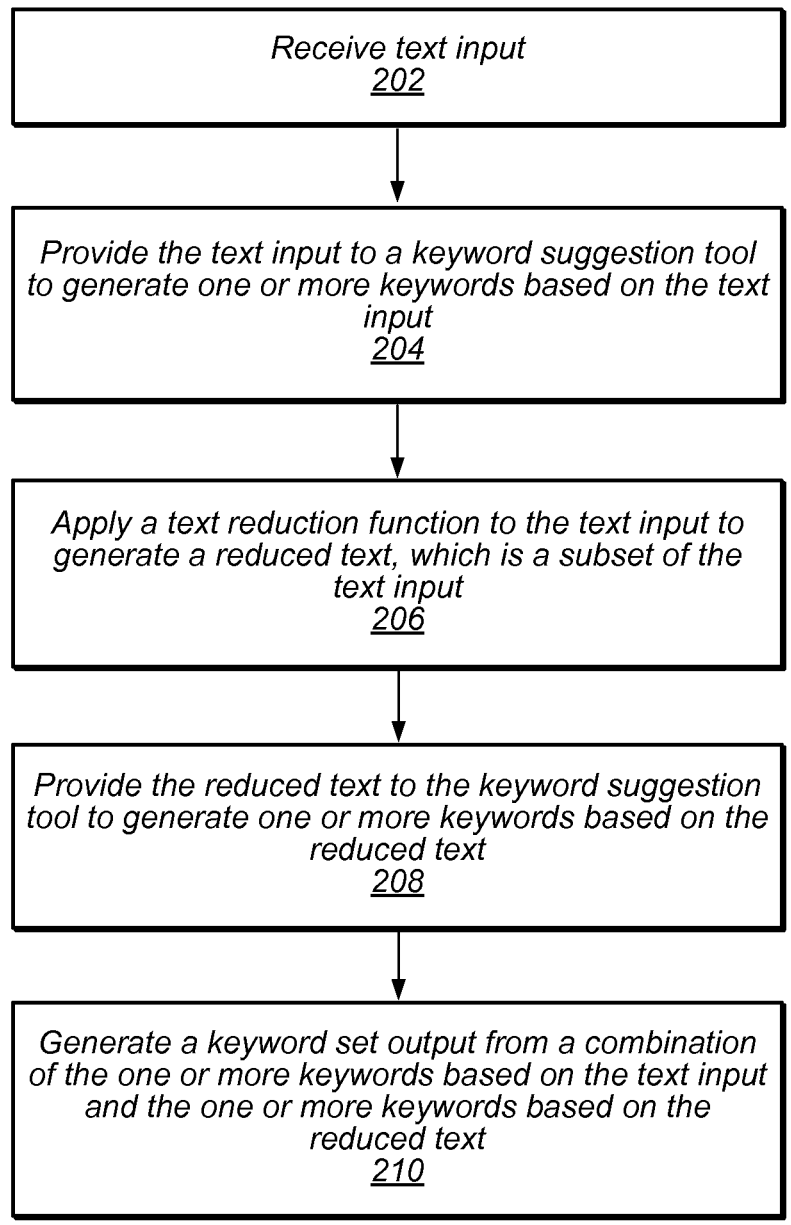
FIG. 2 is a flowchart of an embodiment of the keyword refinement tool that combines output from a keyword suggestion tool and a text reduction function.

FIG. 2 illustrates a flowchart highlighting certain processing steps that may be present in an embodiment of the keyword refinement tool. In this embodiment, the keyword refinement tool process begins with receiving text input, as in step 202. In some embodiments, text input may be received regarding a news story to be posted on a website. Given the time sensitivity of many news stories, the website operator may wish to post a news story immediately. In some embodiments, along with posting the news story itself, the website operator may wish to tag the web page with keywords by the keyword refinement tool for use by a search engine in order for the keywords to result in the search engine prominently displaying the news story. The more prominently a search engine presents the website operator's news story, the more likely that users will be attracted to click through the search results to visit the web page containing the news story. If the source of the text input is an RSS feed describing a product or service, similar benefits from increased traffic through the use of high quality keywords apply.

Given text input, the keyword refinement tool may provide the received text input to a keyword suggestion tool in order for the keyword suggestion tool to generate one or more keywords based on the input text and to provide the keyword refinement tool with the generated results, as in step 204. In some embodiments, the keyword suggestion tool may be accessed remotely over a network. In other embodiments, the keyword suggestion tool may be implemented locally on the same system implementing the keyword refinement tool.

In this embodiment, the keyword refinement tool may apply a text reduction function to the text input in order to generate a reduced text, which is a subset of the text input, as in step 206. In some embodiments, the text reduction function eliminates some of the words or phrases of the original input text in order to generate a subset of words in which overly common or overly rare words are eliminated.

In some embodiments, a user may provide input specifying how selective the text reduction function should be. While not necessarily providing a numerical value, a user may, for example, using a slider, drag a knob along the slider to indicate an increased or decreased threshold tolerance for common words. For example, if a user wants more results, the user may move the slider knob to an increased tolerance for common words. In this example, if the user wants fewer keywords to be generated, the user may move the slider knob to indicate a lower tolerance for common words.

In other embodiments, the user-adjustable slider may indicate how tolerant the text reduction tool may be of keywords farthest from the average importance ranking of keywords. In other words, a high tolerance for outlying rankings would include words that are very common and words that are very rare. Similarly, a low tolerance for outlying words would exclude words that are common and words that are very rare. In this way, the user may experiment with identifying a middle ground of selectivity that may produce the best keyword set results. In some embodiments, a slider may be provided for indicating tolerance for outlying rankings of common words and another slider may be provided for indicating tolerance for outlying rankings of rare words.

In some embodiments, the text reduction function may first provide the text input to a keyword ranking tool, which in turn provides the text reduction function a list that includes each term from the input text along with a corresponding ranking value. In some cases, the ranking value may indicate a level of importance of the term within the text input. For example, given text input describing a television, the term "plasma" may be given a ranking value higher than the term "the." In some embodiments, the keyword ranking tool may be accessed remotely over a network, and in other cases, the keyword ranking tool may be accessed locally on the same system implementing the keyword refinement tool.

In some embodiments, the keyword ranking tool may be an implementation of the term frequency-inverse document frequency (tf-idf) algorithm for generating weights for terms within an input. In other embodiments, other term or keyword ranking tools may be used by the text reduction function. Given that the ranking tool somehow provides a measure of a terms relative importance within a given input text, the text reduction function may use the ranking to reduce an input text into a subset of keywords.

Some keyword ranking tools measure term importance only for individual words, and not for pairs of words or phrases. In some embodiments, the text reduction function may modify the importance of one or more term rankings to reflect that the one or more terms are part of a pair of words or phrase. In other embodiments, the keyword ranking tool rankings may be left unmodified, however if a pair of words is detected, then the pair may be introduced into the results and the pair may be assigned a ranking value that is higher than either component word. Since a keyword may be one or more words, the newly added pair of words may simply be considered the addition of a keyword.

In some embodiments, the keyword ranking tool may use a single large corpus of documents as a reference for determining the importance of a particular term within an input text. In some embodiments, instead of a default corpus, a user may be given the option of selecting a corpus to use.

In other embodiments, the keyword refinement tool may determine a particular corpus with which to use the keyword ranking tool in order to provide better context to the ranking algorithm within the keyword ranking tool. For example, instead of a monolithic corpus, there may be a corpus directed toward electronic merchandise, or more specifically to a particular category of electronic device, such as home entertainment. In this example, there may be another corpus directed toward popular culture and entertainment, which would include terms on celebrities, fads, trends, memes, or gossip. Given a selection of corpuses, the keyword refinement tool may use the results produced by a call to a keyword suggestion tool to decide which corpus would best fit the input text in order to provide the keyword ranking tool with a corpus that provides the most appropriate context.

In embodiments where the functionality of a keyword ranking tool is incorporated into the keyword refinement tool, the factors determining term importance may be adjusted. For example, the keyword ranking tool may be defined to count the number of documents within which a given term occurs and use that count as a factor to increase the importance of the term. In this way, a term that occurs in a large number of different documents is given more weight that a term that occurs frequently within a single or small number of documents.

Once the keyword refinement tool has invoked the text reduction function to generate a reduced text, the keyword refinement tool may provide the reduced text to the keyword suggestion tool. The keyword suggestion tool, upon being provided with the reduced text, may generate one or more keywords based on the reduced text, as in step 208.

At this point, the keyword refinement tool has received one or more keywords from the keyword suggestion tool based on the original input text and one or more keywords from the keyword suggestion too based on the reduced text. Given these two keyword results, the keyword refinement tool may generate a keyword set output from a combination of the one or more keywords based on the input text and the one or more keywords based on the reduced text, as in step 210.

In other embodiments, in order to present a user with the highest quality keyword first, the keyword refinement tool may, after generating the keyword set output, sort the keywords within the keyword set output. The sorting of the keywords within the keyword set output may be based on the number of occurrences of the keyword within the original input text. In other words, if one keyword of the keyword set output occurs 5 times within the original text input, and another keyword occurs 3 times within the original text input, the keyword occurring 5 times may be ordered before the keyword occurring 3 times.

In other embodiments, instead of a sort according based on frequency of occurrence within the original text, a sort may be performed based on multiple factors. For example, a weight may be assigned to a keyword based on the number of occurrences of the keyword in the original text, and another weight may be assigned to the same keyword based on whether the keyword appears in both the keywords based on the input text and the keywords based on the reduced text. In this way, keywords with a high number of occurrences in the original text and that also appear in multiple results from the keyword suggestion tool are ranked highly.

Example Embodiment: Generating a Keyword Set

Figure 3:
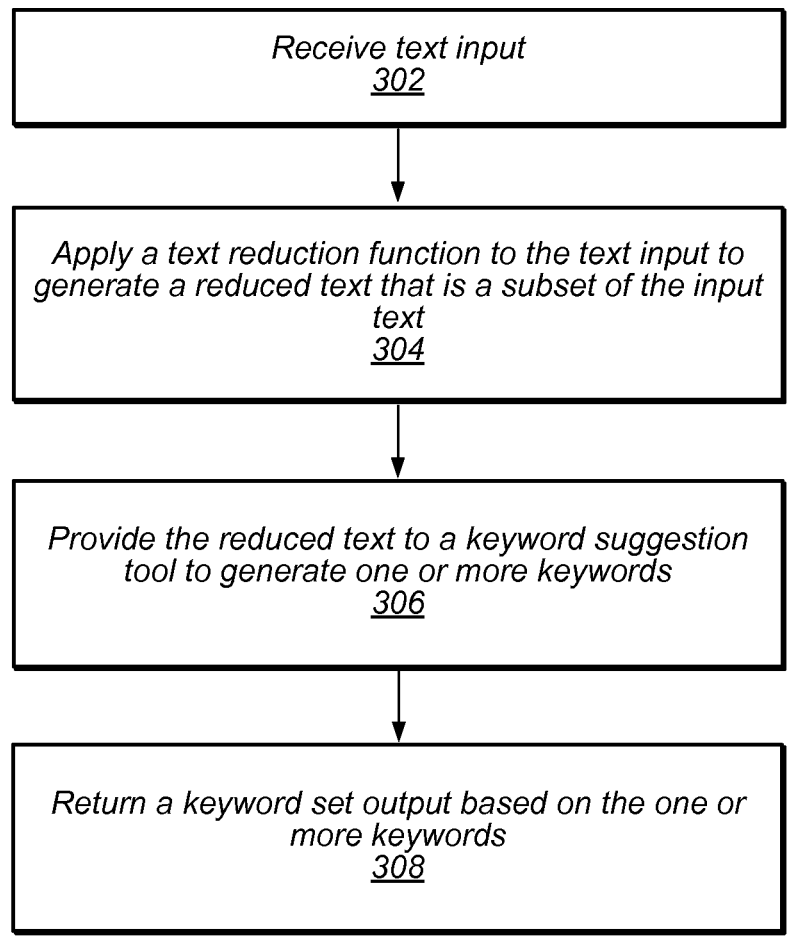
FIG. 3 is a flowchart of an embodiment of the keyword refinement tool without a step combining multiple outputs from a keyword suggestion tool.

FIG. 3 illustrates a flowchart highlighting certain processing steps that may be present in an embodiment of the keyword refinement tool. In this embodiment, the keyword refinement tool process begins with receiving text input, as in step 302.

Similarly to step 206 of FIG. 2, the keyword refinement tool may apply a text reduction function to the input text to generate a reduced text that is a subset of the input text, as in step 304.

Given a reduced text, the keyword refinement tool may provide the reduced text to a keyword suggestion tool, as in step 306. The operation of this step is similar to step 208 discussed above with respect to FIG. 2, and may be similarly varied.

A potential consequence of invoking the keyword suggestion tool with only a reduced text instead of the entire original text is that the keyword suggestion tool may not generate a sufficient quantity of keywords. In some embodiments, instead of only providing the reduced text to a single keyword suggestion tool, the keyword refinement tool may provide the reduced text to multiple keyword suggestion tools and combine the returned results. While there may be a significant amount of overlap of results, after eliminating duplicates, any additional keywords over using a single keyword suggestion tool would provide a larger pool of keywords. Further, in the case that the keyword suggestion tool is accessed remotely over a network, the additional overhead is minimal since calls to two or more different keyword suggestion tools may be performed in parallel.

After the keyword refinement tool receives the one or more keywords generated by the keyword suggestion tool or tools, the keyword refinement tool may return the one or more keywords as a keyword set output, as in step 308.

In some embodiments, the keyword refinement tool may sort the keyword set output according to the number of times each keyword in the keyword set output occurs within the original input text.

Example Embodiment: Generating a Keyword Set

Figure 4:
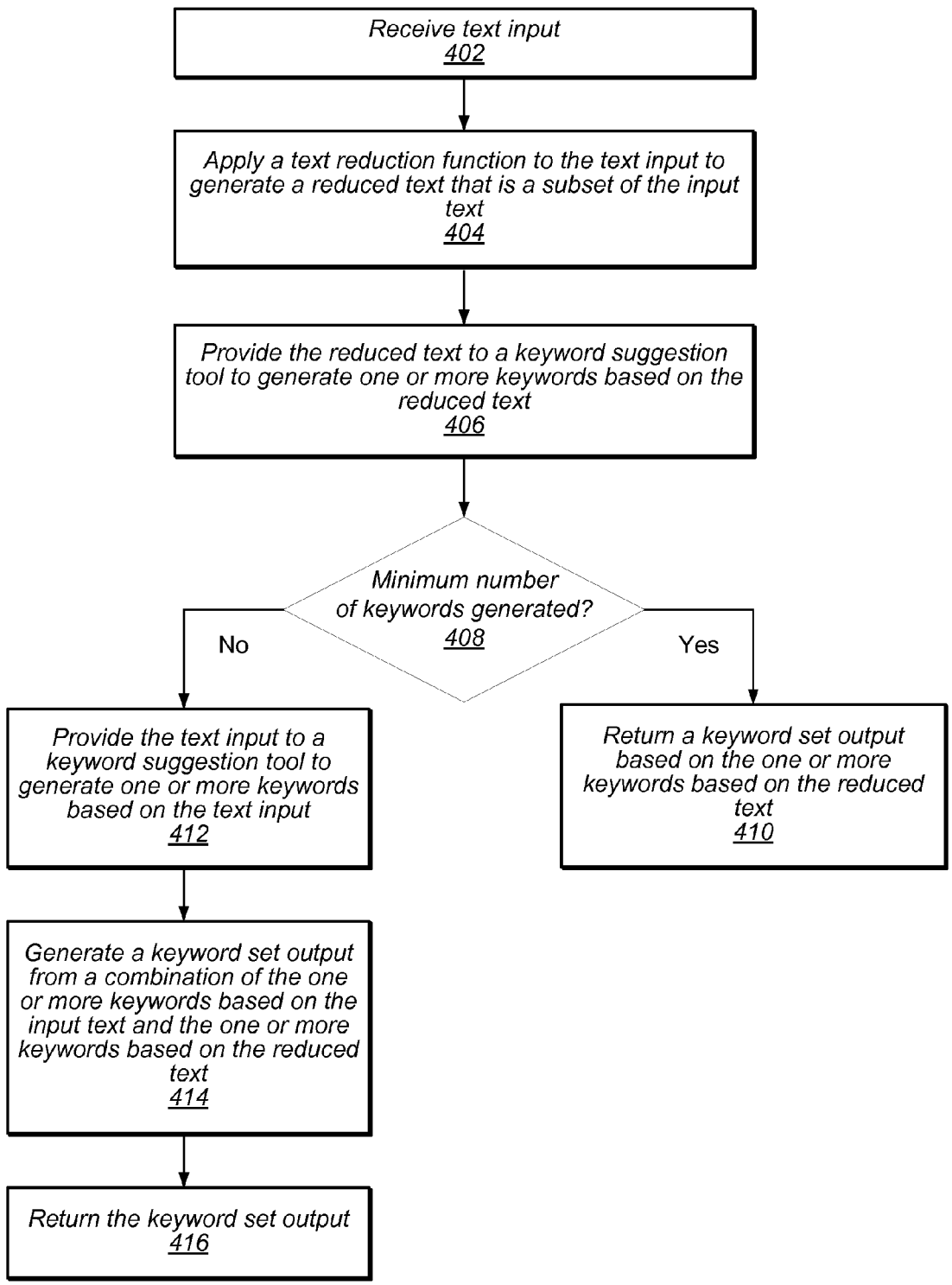
FIG. 4 is a flowchart of an embodiment of the keyword refinement tool that conditionally combines output from a keyword suggestion tool and a text reduction function.

FIG. 4 illustrates a flowchart highlighting certain processing steps that may be present in an embodiment of the keyword refinement tool. In this embodiment, the keyword refinement tool process begins with receiving text input, as in step 402.

Similarly to step 206 of FIG. 2, the keyword refinement tool may apply a text reduction function to the input text to generate a reduced text that is a subset of the input text, as in step 304.

Given a reduced text, the keyword refinement tool may provide the reduced text to a keyword suggestion tool, as in step 306. The operation of this step is similar to step 208 discussed above with respect to FIG. 2, and may be similarly varied.

As noted above with respect to FIG. 3, it may sometimes be the case that keyword suggestion tool, operating on the reduced text, may provide a small number of keywords. In some embodiments, a user may specify a minimum number of keywords, or the keyword refinement tool may have a pre-defined minimum number of keywords. In either case, if the minimum number of keywords has been generated, then the keyword refinement tool may return a keyword set output based on the one or more keywords based on the reduced text. The determination of whether a minimum number of keywords has been generated by the keyword suggestion tool operating on the reduced set is illustrated in step 408, and the return of the keyword set output in case the minimum has been met is illustrated in step 410.

If determination step 408 determines that the minimum number of keywords has not been generated, operation of the keyword refinement tool continues at step 412. Step 412 illustrates the keyword refinement tool providing the original text input to the keyword suggestion tool in order to generate one or more keywords based on the text input. This step results in the keyword refinement tool having access to a new, and most likely, larger set of keywords since the input provided was the entire original input text instead of the reduced text.

At step 414, the keyword refinement tool generates a keyword set output from a combination of the one or more keywords based on the input text and the one or more keywords based on the reduced text. In some embodiments, the keyword refinement tool may sort the keywords of the keyword set output prior to returning the keyword set output, as described above. In other embodiments, a user may specify a maximum number of keyword results, say n, and in this case, after sorting, the first n keywords are defined to be the keyword set output.

Once the keyword set output has been generated, the keyword refinement tool may return the keyword set output, as in step 416. Depending on the embodiment, the keyword refinement tool may return the keyword set output directly to a user or to another application making use of the keyword refinement tool.

Example Embodiment: Generating a Campaign Advertising Object

Figure 5:
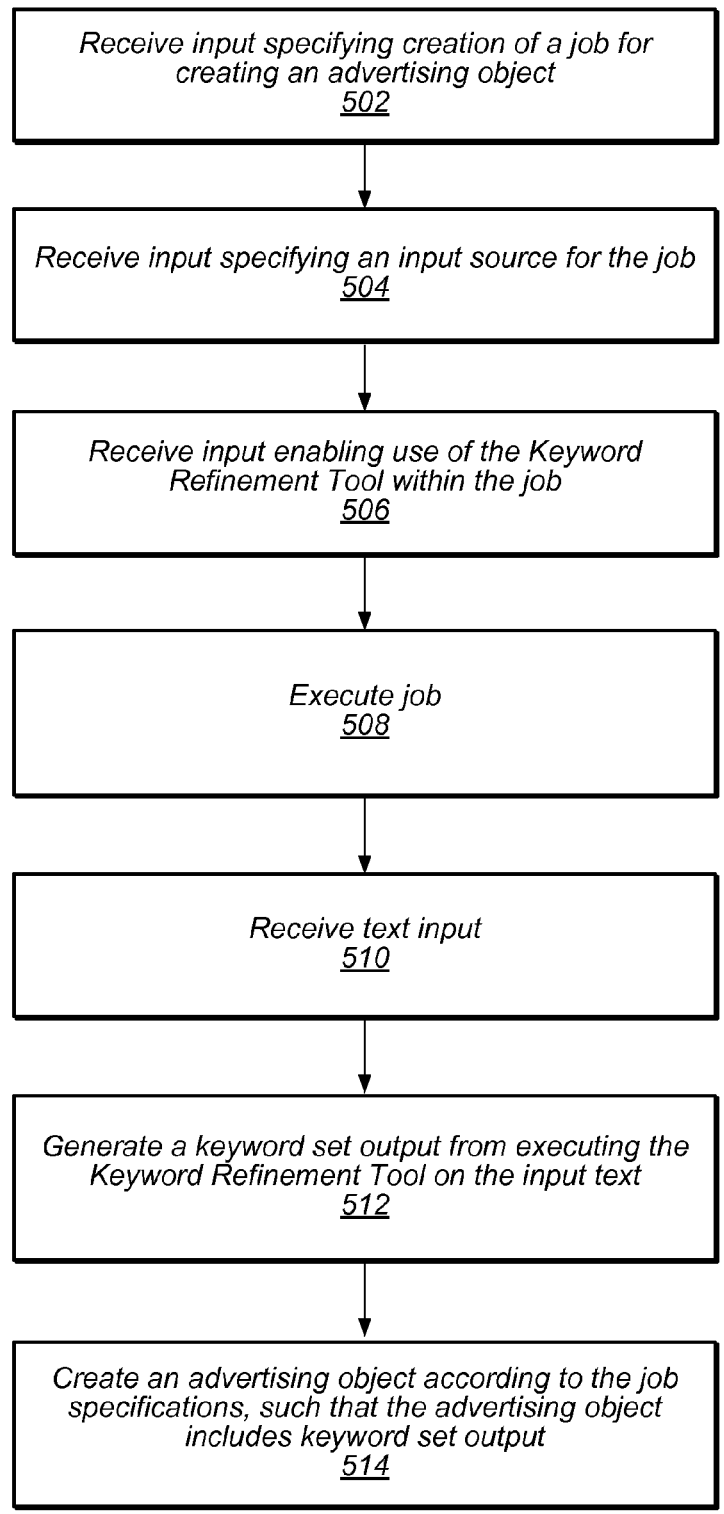
FIG. 5 is a flowchart of the keyword refinement tool within the larger context of creating an advertising object.

FIG. 5 illustrates a flowchart highlighting certain processing steps that may be present in an embodiment of an automated campaign generator that incorporates an embodiment of the keyword refinement tool.

An advertising object may be created by specifying a job within an automated campaign generator, such as through Adobe® SearchCenter™. A job provides the structure defining where a campaign generator looks for information, the type of object or objects to create, and how often to create the object or objects.

FIG. 6 illustrates selected user interface elements within a job creation user interface 600 through which a user may specify elements of a job. Within the user interface elements of the job creation window are selections for a user to specify the input source. While the job creation user interface displays two options, an RSS source and an upload, other sources may be used. As depicted by element 604, the sources tab is a drop down menu that may provide options for defining the input source.

In this embodiment, the automated campaign generation process begins with receiving input specifying parameters for the creation of a job that when executed may create an advertising object, as in step 502.

As part of the creation of the job, the automated campaign generation process may receive input specifying a source from which the job, when executed, may receive text input, as in step 504.

Further as part of the creation of the job, the automated campaign generation process may receive input specifying that the job, when executed, invoke the keyword refinement tool to automatically generate keywords for the advertising object, as in step 506. The option within the job creation user interface for specifying this option is depicted by element 602 of FIG. 6.

In some embodiments, the job may execute immediately upon being fully specified, in such a case, the automated campaign generation process may continue as indicated by step 508. In other cases, a user may specify that the job being created simply be saved for later execution, or that the job be scheduled to execute at some later time.

In this embodiment, upon execution of the job, text input from the specified source may be received, as in step 510. At this point, the job may invoke the keyword refinement tool in order to generate a keyword set output based on the input text, as in step 512. The keyword refinement tool may be implemented by any of the above described embodiments of the keyword refinement tool as described with respect to FIGS. 2, 3, and 4.

As part of creating the advertising object, the job may include the keyword set output generated by the keyword refinement tool, as in step 514. In addition to including the keyword set output, the job may define other aspects of the advertising object as specified during the creation of the job. In some embodiments, the keyword set output is automatically incorporated into the advertising object, and in other embodiments, a user may first be provided the option of reviewing or editing the keyword set output.

Example Embodiment: Remote Tools

Figure 7:
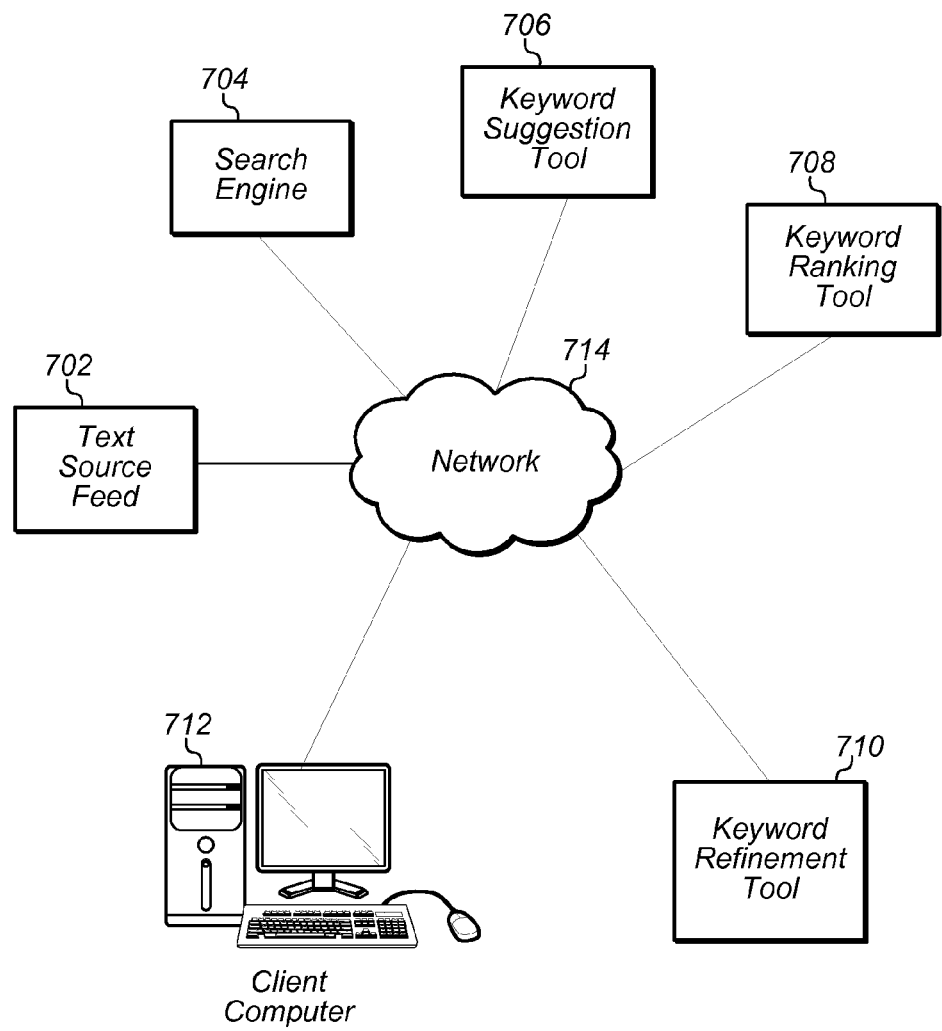
FIG. 7 depicts an illustration of a networked computing environment in which some computing elements of the keyword refinement tool may be implemented remotely across a network.
Figure 8:
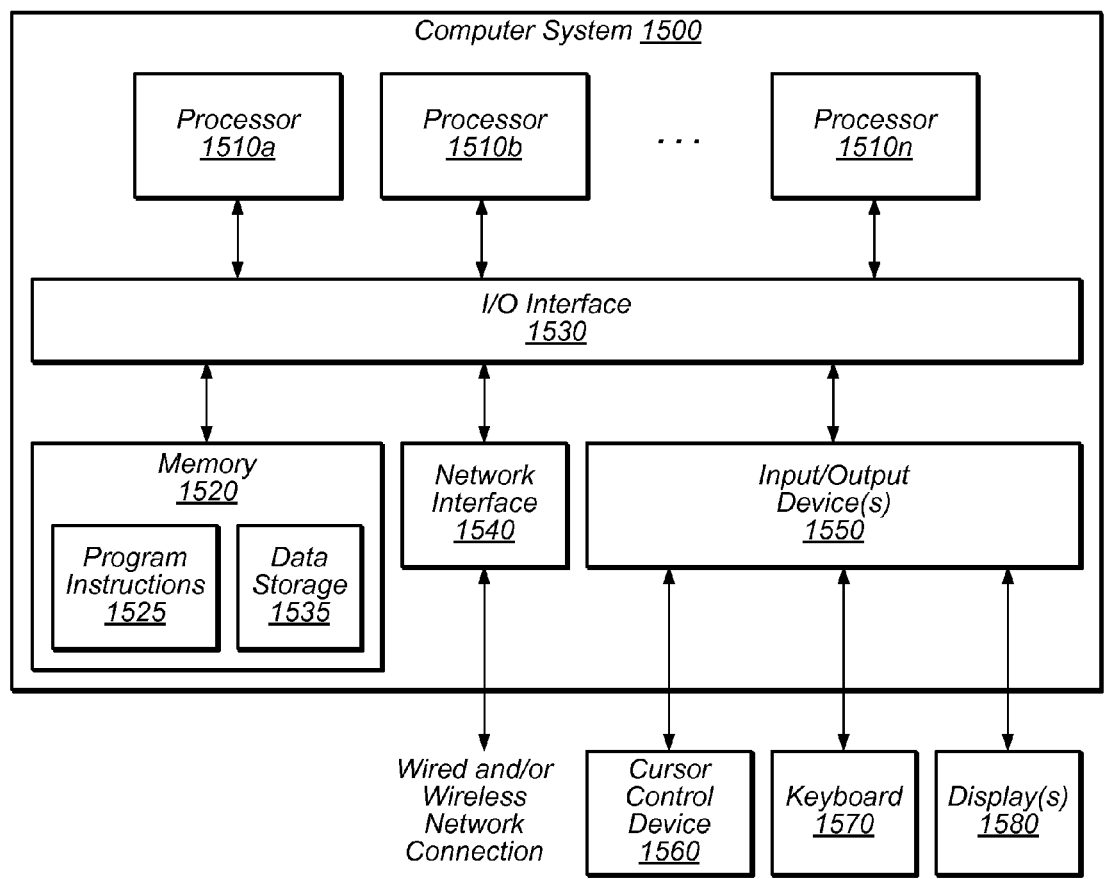
FIG. 8 depicts a computer system suitable for an implementation of the text adjustment tool, according to some embodiments.

FIG. 7 illustrates a network environment depicting certain computing components that may be accessed across a network as part of the execution of the keyword refinement tool, in some embodiments.

A user, at a client computer 712, may invoke the keyword refinement tool directly or through the incorporation of the keyword refinement tool within another tool, such as the automated campaign generator described above. In this embodiment, the keyword refinement tool 710 may be accessed by the user through network 714.

As described above with respect to FIGS. 2, 3, and 4, the keyword refinement tool may access keyword suggestion tool 706 and keyword ranking tool 708 over a network. While in some embodiments, the keyword refinement tool may upload input text locally, in other embodiments, the keyword refinement tool may receive input text remotely across a network from a source such as text source feed 702.

Also depicted within FIG. 7 is a search engine component 704 may reference the keyword set output generated by the keyword refinement tool in order to determine a ranking of the content associated with the keyword set output.

Given this distributed array of computing elements, operation of the steps of the keyword refinement tool proceed as described above with respect to FIGS. 2, 3, and 4.

Example Computer System

FIG. 9 illustrates a computer system 1500 that may execute embodiments of the keyword refinement tool. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, the computer system includes one or more processors coupled to a system memory via an input/output (I/O) interface. The computer system further includes a network interface coupled to an I/O interface, and one or more input/output devices, such as a cursor control device, a keyboard, and display(s). In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible by a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the keyword refinement tool are shown stored within system memory as program instructions and data storage, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted by transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for use by another component. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data by one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement embodiments of the keyword refinement tool as described herein. In one embodiment, the program instructions may include software elements of embodiments of the modules discussed earlier in one of the embodiments of the keyword refinement tool. The data storage within the computer system may include data that may be used in other embodiments. In these other embodiments, other or different software elements and data may be included.

Those skilled in the art will appreciate that the computer system is merely illustrative and is not intended to limit the scope of the keyword refinement tool as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or by a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   receiving text input, the text input including content associated with an input source;
   providing the text input to a keyword suggestion tool, wherein the keyword suggestion tool generates one or more keywords based on the text input;
   applying a text reduction function to the text input to generate a reduced text that is a subset of the text input, wherein the text reduction function is based on a term importance score of terms in the text input;
   providing the reduced text to the keyword suggestion tool, wherein the keyword suggestion tool generates one or more keywords based on the reduced text, the one or more keywords generated based on the reduced text generated independently from the one or more keywords generated based on the text input; and generating a keyword set output from a combination of the one or more keywords based on the text input and the one or more keywords based on the reduced text.

2. The computer-implemented method of claim 1, wherein said generating further comprises:

sorting the keyword set output according to a number of occurrences of a keyword of the keyword set output within the text input.

3. The computer-implemented method of claim 1, wherein the text reduction function further comprises:

calculating the term importance score for each term within the text input by determining a frequency of the term within the text input and by offsetting the term importance score by a frequency of the term within a corpus of input texts.

4. The computer-implemented method of claim 1, wherein said applying the text reduction function comprises transmitting the text input across a network to a remote system and receiving the reduced text in response to said transmitting.

5. The computer-implemented method of claim 1, wherein the text input is received periodically or aperiodically from a source feed.

6. The computer-implemented method of claim 1, further comprising executing an advertisement object creation job, wherein the job comprises a specification for an input source feed for providing the text input;

wherein the job comprises a specification enabling said generating the keyword set output; and wherein execution of the job comprises creating an advertisement object comprising the keyword set output.

7. A computer-implemented method, comprising:

receiving text input;

applying a text reduction function to the text input to generate a reduced text that is a subset of the text input, wherein the text reduction function is based on a term importance scoring of terms in the text input; and providing the reduced text to a keyword suggestion tool, wherein the keyword suggestion tool generates one or more keywords based on the reduced text;

based on determining that an amount of the one or more keywords generated based on the reduced text does not satisfy a threshold amount of keywords, providing the text input to the keyword suggestion tool, wherein the keyword suggestion tool generates one or more keywords based on the text input; and returning a keyword set output.

8. The computer-implemented method of claim 7, wherein said generating further comprises:

sorting the keyword set output according to a number of occurrences of a keyword of the keyword set output within the input text.

9. A system, comprising:

at least one processor; and a memory comprising program instructions, wherein the program instructions are executable by the at least one processor to:

receive text input, the text input including content associated with an input source;

provide the text input to a keyword suggestion tool, wherein the keyword suggestion tool generates one or more keywords based on the text input;

apply a text reduction function to the text input to generate a reduced text that is a subset of the text input, wherein the text reduction function is based on a term importance score of terms in the text input;

provide the reduced text to the keyword suggestion tool, wherein the keyword suggestion tool generates one or more keywords based on the reduced text, the one or more keywords generated based on the reduced text generated independently from the one or more keywords generated based on the text input; and generate a keyword set output from a combination of the one or more keywords based on the text input and the one or more keywords based on the reduced text.

10. The system of claim 9, wherein the program instructions to generate the keyword set output are further executable by the at least one processor to:

sort the keyword set output according to a number of occurrences of a keyword of the keyword set output within the text input.

11. The system of claim 9, wherein the program instructions for the text reduction function are further executable by the at least one processor to:

calculate the term importance score for each term within the text input by determining a frequency of the term within the text input and by offsetting the term importance score by a frequency of the term within a corpus of input texts.

12. The system of claim 9, wherein the program instructions to apply the text reduction function are further executable by the at least one processor to:

transmit the text input across a network to a remote system and receiving the reduced text in response to said transmission.

13. The system of claim 9, wherein the program instructions to receive the text input are further executable by the at least one processor to:

receive, periodically or aperiodically, the text input from a source feed.

14. A computer-readable storage medium storing program instructions, wherein the program instructions are computer-executable to implement:

receiving text input, the text input including content associated with an input source;

providing the text input to a keyword suggestion tool, wherein the keyword suggestion tool generates one or more keywords based on the text input;

applying a text reduction function to the text input to generate a reduced text that is a subset of the text input, wherein the text reduction function is based on a term importance score of terms in the text input;

providing the reduced text to the keyword suggestion tool, wherein the keyword suggestion tool generates one or more keywords based on the reduced text, the one or more keywords generated based on the reduced text generated independently from the one or more keywords generated based on the text input; and generating a keyword set output from a combination of the one or more keywords based on the text input and the one or more keywords based on the reduced text.

15. The computer-readable storage medium of claim 14, wherein said generating further comprises:

sorting the keyword set output according to a number of occurrences of a keyword of the keyword set output within the text input.

16. The computer-readable storage medium of claim 14, wherein the text reduction function further comprises:

calculating the term importance score for each term within the text input by determining a frequency of the term within the text input and by offsetting the term importance score by a frequency of the term within a corpus of input texts.

17. The computer-readable storage medium of claim 14, wherein said applying the text reduction comprises transmitting the text input across a network to a remote system and receiving the reduced text in response to said transmitting.

18. The computer-readable storage medium of claim 14, wherein the text input is received periodically or aperiodically from a source feed.

19. The computer-readable storage medium of claim 14, wherein the program instructions further implement:
   executing an advertisement object creation job,
      wherein the job comprises a specification for an input source feed for providing the text input,
      wherein the job comprises a specification enabling said generating the keyword set output, and
      wherein execution of the job comprises creating an advertisement object comprising the keyword set output.

* * * * *